United States Patent [19]

Valenta

[11] 4,264,543

[45] Apr. 28, 1981

[54] PROCESS FOR MANUFACTURING SYNTHETIC GYPSUM ABSORBENT GRANULES

[75] Inventor: Rudolph C. Valenta, Elmhurst, Ill.

[73] Assignee: Oil-Dri Corporation of America, Chicago, Ill.

[21] Appl. No.: 29,383

[22] Filed: Apr. 12, 1979

Related U.S. Application Data

[63] Continuation of Ser. No. 775,589, Mar. 8, 1977, abandoned.

[51] Int. Cl.³ .......................... C09C 1/02; C09C 1/58
[52] U.S. Cl. .................................... 264/37; 23/313 P; 264/117
[58] Field of Search ................. 264/37, 117; 23/313 P

[56] References Cited

U.S. PATENT DOCUMENTS

| | | | |
|---|---|---|---|
| 1,239,221 | 9/1917 | Rodman | 23/313 P |
| 2,436,766 | 2/1948 | Davis | 23/313 P X |
| 3,035,301 | 5/1962 | Rodis | 264/117 X |
| 3,140,326 | 7/1964 | Erck | 23/313 P X |
| 3,211,522 | 10/1965 | Shurter | 23/313 P |
| 3,972,972 | 8/1976 | Yano | 264/117 |
| 4,108,932 | 8/1978 | Takewell | 264/37 |

OTHER PUBLICATIONS

The Chemistry of Cement and Concrete, F. M. Lea, 2nd Ed., Edward Arnold (Publishers) Ltd., London, 1956, p. 216.

*Primary Examiner*—Thomas P. Pavelko
*Attorney, Agent, or Firm*—Dressler, Goldsmith, Shore, Sutker & Milnamow, Ltd.

[57] ABSTRACT

Synthetic absorbent granules of calcium sulfate dihydrate are manufactured by a process which utilizes a commercial type of dry powdered gypsum plaster or calcium sulfate hemihydrate, mixes the plaster with water in an inclined rotating disc machine to cause hydration to occur, and wherein the plaster is formed and grown into balls or granules of a generally predetermined size and discharged from the disc when reaching such size. The ball forming operation is started in the disc with seed material in the form of balls of a size corresponding generally to the balls to be manufactured by the process. Water spray is applied to the seed material in the rotating disc and a uniform pattern of movement of such material with a well defined eye is developed. When this occurs, generally the water is turned off. Dry powdered gypsum plaster is fed to the rotating disc from a position adjacent the base of the eye and then water spray is fed to the disc through a nozzle located so that the water will not strike the eye formation of the moving material. With the plaster being fed to the disc the seed material balls grow to a size where they are discharged from the inclined rotating disc at a lower portion thereof, and meanwhile the dry powdered plaster coming in contact with the water spray forms into new tiny balls, and these grow as the mix moves in the inclined rotating disc until they reach a size at which they are discharged. During this operation, while the balls grow in size and the plaster is hydrating, the material in the disc is visually observed, and if the balls or granules are too dry that they are not growing, or if they are too wet that they stick together, of if the eye configuration in the moving material is not proper, adjustments are made in one or more of the processing conditions including the position or amount of the water spray, the position or amount of the plaster feed, the speed of rotation of the disc, or the inclination thereof. When the desired eye configuration is restored from needed adjustments, the balls or granules grow, they are discharged, and they are dried and then screened to the desired size, with large balls or granules crushed and again screened to the desired size. The screened synthetic balls or granules are ready for marketing and use as absorbents for various purposes including the absorbing of undesirable oil, grease and other liquid accumulation on floors, of animal toilet refuse as in cat boxes, and the serving as carriers for agricultural chemicals to be distributed in such granular form.

3 Claims, 8 Drawing Figures

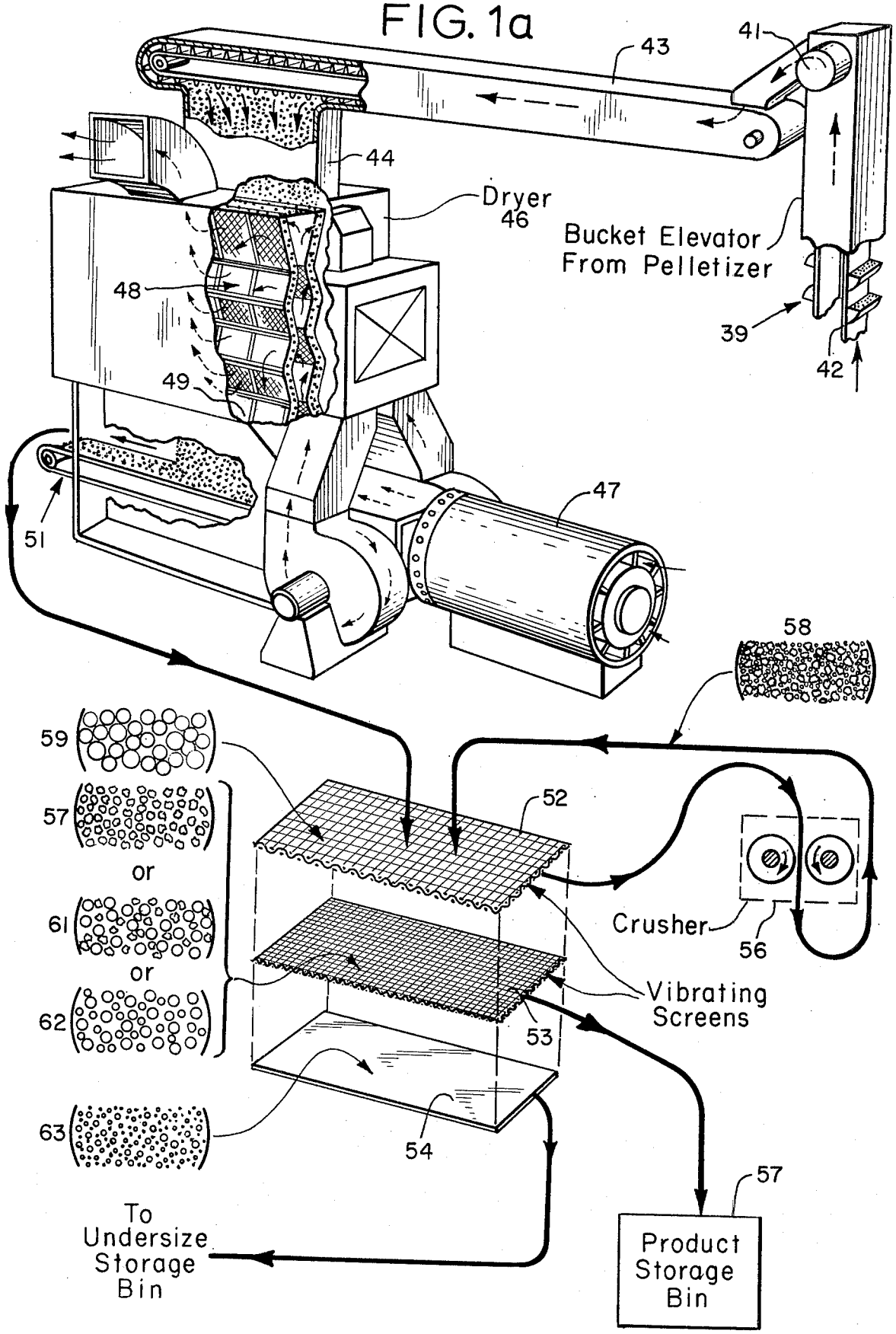

PROCESS FOR MANUFACTURING SYNTHETIC GYPSUM ABSORBENT GRANULES

CROSS-REFERENCE TO RELATED APPLICATION

This is a continuation of application Ser. No. 775,589, filed Mar. 8, 1977, now abandoned.

The invention of this application is an improvement on the subject matter disclosed in the application of Karl Been, Ser. No. 683,090 filed May 4, 1976, abandoned and assigned to Oil-Dri Corporation of America, the assignee of the present application.

BACKGROUND OF THE INVENTION

Over the past forty years, in particular, an industry has developed wherein naturally occurring sorptive minerals, and primarily the absorbent clay known as fuller's earth, have had ever-increasing uses as granular absorbents to take up undesirable accumulations of oil and grease and other liquids on the floor in factories, in machine shops, filling stations and the like. This absorbent clay in granular form has also had an ever-expanding use in pet animal toilet boxes, and especially for so-called cat boxes. A further use has been found for such absorbent clay granules as carriers for agricultural chemicals whereby pesticides, herbicides, fertilizers and the like are combined with such a carrier and distributed by various means to control weeds, pests, and the like. The porosity, and hence the absorbent property of the absorbent clays, as well as low bulk density are significant properties in the above uses for this granular clay material. The granules as used result from crushing, calcining, and screening and vary in size for the different uses, but in general, they range from those which would pass through a standard 6 mesh screen to those which are retained on a 60 mesh screen. In all of the above products made from absorbent clay such as fuller's earth, it is important that during use the granules maintain the size and condition in which they are marketed. Also, it is important that the absorbent clay granules do not turn to dust, for the dust causes objectionable dirtiness, and it spreads in the air, on persons, or on animals using the material.

Generally, the fuller's earth absorbent clay has performed a useful function in this industry which has been built around the desirable properties described above. There is a problem in utilizing fines which result from the crushing and screening of the absorbent clay to provide it in useable granule form, and such fines have been largely a waste product in the industry. The present applicant invented a process for pelletizing such fines which is covered in application Ser. No. 668,637, now U.S. Pat. No. 4,036,928 and assigned to Oil-Dri Corporation of America. This is a satisfactory utilization of such fines, but it does represent a cost factor to convert the fines to useable absorbent clay granules. However, the relatively few deposits geographically of the most desirable absorptive clay minerals pose the principal problem for this adds materially to cost in shipping packaged material, or shipping such materials in the bulk, over long distances to the principal markets for such absorbent clay granules.

The need for such absorbents of the character of the present invention is worldwide, and the greatest need is in industrial, agricultural, and urban areas. Many of these areas are far removed from the sources of sorptive minerals such as absorbent clay, and the resulting problems have created hurdles for some time that the industry must surmount if it is to satisfy in an acceptable manner the needs of industry and agriculture, as well as those for the animal pet boxes.

Efforts have long been made to find an acceptable synthetic substitute more readily available to the principal markets for the most desirable clay absorbents, but until the invention of the process and product of the Been application referred to above such efforts have been unsuccessful. The synthetic absorbent granules of the Been application identified above, and those of the present invention, which is an improvement over the Been invention, both utilize a commercial type gypsum plaster which is rehydrated to gypsum. Gypsum plaster of a commercial type is available in commercial, urban, and agricultural areas, and the present invention is practiced with equally available equipment. Hence, the invention can be practiced in many areas in the world to provide a useful absorbent product without incurring excessive transportation costs.

Before providing a summary description of the present invention, certain words and phrases will be explained for their meaning as used in this application.

"Agricultural chemicals" as used herein means pesticides, herbicides, insecticides and the like for which the synthetic granular absorbent of the product invention acts as a carrier in the sense that word is commonly used in this art. A particular agricultural chemical (or chemicals) in whatever form and in whatever way it is combined with synthetic granular material, is distributed in different conventional means by spreading, or by otherwise applying such material to the weeds, crops, and the like to be affected.

"Aridization" as a property of the commercial gypsum plasters used in the practice of the present process, and as used herein, means the step in processing the naturally occurring gypsum rock when calcium chloride salt is introduced into the water demand of the plaster resulting from the calcination.

"Balls", and "granules" have the same general meaning herein, and each word identifies the liquid absorbent material manufactured by the present process. "Granule" is defined as a small particle, but in this application to distinguish the minute dry powdered plaster pieces, the word "particle" is used herein for the latter.

"Density", or "bulk density" as related to the synthetic absorbent of the present invention is a factor from the standpoints of weight and volume in packaging such products, and is an equally important factor in the use of such synthetic granules as carriers for agricultural chemicals. This property affects the weight and volume of material which goes into a bag or package of a predetermined size for accomodating the volume printed on the bag or package. Weight and volume of the granules represented in the carrier material are also important in the loading and in the operation of the spreading equipment for such carrier material. Furthermore, with respect to such synthetic granular absorbent, the lower the density the higher the absorptive capacity thereof, so that density is an important factor with respect to absorptive capacity which is the characteristic that must be obtained in the synthetic material manufactured.

"Consistency" means a measurement of the water carrying capacity of the plaster or calcium sulfate hemihydrate.

"Liquid" and "moisture" are used interchangeably herein, because that to be absorbed by the product of the present invention may represent a problem with a strict definition for each word and "moisture" is liquid although possibly diffused or condensed.

"Stucco" as the name of material processed by the present invention is synonomous with "plaster" so far as the present process is concerned.

DISCUSSION OF PRIOR ART AND SUMMARY OF THE INVENTION

In prior practices powdered gypsum plaster, or calcium sulfate hemihydrate, has been mixed with water, and with other ingredients to provide various products. However, neither such prior products, nor the prior processes for making the same provided a synthetic granular gypsum absorbent for absorbing undesirable accumulations of oil and grease and other liquids on the floor, for absorbing animal discharge as in a cat box or the like, and for absorbing agricultural chemicals for distributing the same, nor did the art suggest such absorbent uses for the prior products.

Naturally occurring mineral gypsum, or calcium sulfate dihydrate, has been known throughout its long history as a mineral with many variations in characteristics which have posed problems to those working with the same. Correspondingly, the gypsum plaster, or calcium sulfate hemihydrate made from the gypsum rock, has many variations in characteristics as shown generally by the following Manufacturer's Specifications which were obtained from the manufacturer of each of the different commercial type plasters employed in the EXAMPLES which will be described hereinafter in the specification. There are other variables in plaster not mentioned in such specifications, and it is also a fact that such gypsum plasters will vary in properties and characteristics even when made from gypsum rock mined in the same location. Such variables become evident when the plaster is mixed with water.

| MFGS. | Normal Consistency | Vicat Set Min. | Tube Mill. | Ari-dized | % Pass 25 mesh | % Pass 100 mesh |
|---|---|---|---|---|---|---|
| BRITISH GYPSUM | | | | | | |
| Gothan Wks. | 60-65 | 10-20 | No | No | — | 70-80 |
| Newark Wks. | 62 | 13 | No | No | — | 82 |
| U.S. GYPSUM | | | | | | |
| No. 1 Molding-Southard Wks. | 64-66 | 30-40 | No | Yes | 75 | |
| Stucco-East Chicago Wks. | 85-95 | 23 | Yes | No | 82 | |
| Stucco-Jacksonville Wks. | 94-98 | 30 | Yes | Yes | 78 | |

It is an object of my invention to take gypsum plaster which is calcium sulphate hemihydrate, or plaster of Paris (as it is also called) or stucco, each of a standard commercial grade or type available in quantity in most industrialized areas of the world where liquid absorbents are used for the purposes described above, and make a synthetic liquid absorbent by a process which compensates for the many variables found in such material.

Another object of my invention is to provide a process which uses equipment that is available in many locations throughout the world and practice the process in a straightforward manner with such equipment to provide a synthetic liquid absorbent for use in the general area in which it is produced so as to avoid shipping costs which handicap use of the liquid absorbents used today.

A further object is to provide a process and equipment for practicing the process which will produce directly from the equipment absorbent granules of the size and shape desired for the end synthetic absorbent product as it is marketed.

Although the naturally occurring gypsum is not absorbent, it is a still further object of my invention to convert the plaster or calcium sulfate hemihydrate derived from the gypsum to calcium sulfate dihydrate to serve the same liquid absorbent purposes as the prior naturally-occurring fuller's earth absorbent.

One of the features of the present invention is that the process is adapted to a different commercial type gypsum plasters with different manufacturer's specifications and with variations in properties as there shown, and by adjustments made in equipment and processing conditions during the processing of the plaster, synthetic gypsum absorbent granules of a selected size and with essentially uniform characteristics are produced.

Referring briefly to the process and the product of the present invention; a commercial type of gypsum plaster, or calcium sulfate hemihydrate is purchased from a gypsum plaster manufacturer, and as the EXAMPLES hereinafter described show, substantial quantities have been used which were purchased from a British manufacturer, and from a U.S. manufacturer. The plaster can be tested to determine whether the characteristics and properties do correspond to each manufacturer's specifications, but such testing is not necessary for the present invention includes means for making adjustments in the equipment and in the processing to compensate for the many variations and variables peculiar to any gypsum plaster used in the present invention.

The equipment for manufacture of the synthetic absorbent granules includes hopper facilities, a commercially available rotary disc, which is inclined relative to the horizontal, and a conveyor with feed means for feeding the plaster from the hopper to the disc at a determined position for such feed means and at a determined rate. The calcium sulfate dihydrate balls or granules are formed to a desired size in the rotating inclined disc, are automatically then discharged from such rotating disc, they are dried, and then usually screened to size for use as liquid absorbent material. Balls or granules may be made larger than needed for direct use, and after being dried they are crushed so as to be irregular in shape, and screened to provide selected sizes for use particularly as synthetic absorbent granules to be spread on the floor to soak up unwanted oil and grease and other liquids. Balls or granules are also processed directly to the size in which they are ultimately marketed for use in other absorbent purposes.

In starting up an operation, the rotatable disc is positioned at a predetermined angle and filled with granules called "seed" that had been previously made by the present process from gypsum plaster fed to the rotating disc. This so called "seed" material is provided in a size corresponding generally to the desired size for the ultimate granules to be produced, and normally approximately 95% of such seed granules will pass through a standard 6 mesh screen and be retained on a 60 mesh screen, while the majority are substantially of the size of the desired size to be produced in an operation.

Water is applied from a spray nozzle to the seed material in the rotating disc at a selected position, and the disc is rotated at a selected speed until the seed granules are moving in an orderly pattern with an "eye" configuration in the pattern peculiar to the cyclical movement of balls or granules in an inclined rotary disc. The eye is normally on the left side portion of the disc (as viewed from the front), and is clearly visible to the operator. If the eye configuration is proper and stablized, the water spray is turned off and dry powdered gypsum plaster is fed into the disc at a controlled rate from a position at the base of the eye and at the lower quarter portion of the disc. The water spray nozzle is placed at a selected position over the disc so that water does not reach the center of the eye and sprays an area through which the dry powdered plaster moves in the disc.

The seed granules grow and are discharged in this operation as new balls form from the powdered plaster and water. The mix in the rotating disc forms a pattern well enough defined so that the operator can determine by visual observation whether the balls or granules are moving in a proper pattern and forming to the desired size. They must not be so dry that they do not grow, nor so wet that they stick together and hence cannot move independently of one another. As will be pointed out, depending upon visual observation, adjustments can be made in one or more of the operating conditions to effect a balance which will provide the desired absorbent granules as an end product dropping from the rotating disc when they reach the desired size and reach the discharge position in the inclined rotating disc.

The possible adjustments in operating conditions include (1) the angle of inclination of the disc, (2) the speed of rotation of the disc, (3) the volume flow of the dry powdered plaster into the disc, (4) the position at which the dry powdered plaster is fed into the disc, (5) the position of the water nozzle, and (6) the volume and fineness or coarseness of the water spray from the nozzle. Any one or more of such adjustments will be reflected in the uniform movement of the material in the disc and the configuration of the eye.

The desired operating conditions provide balls which are in a desired size range. For ultimate cat box or animal toilet use and for chemical carrier use, the size as the formed balls or granules drop from the rotating disc is the size in which they are marketed and used, although such granules are also screened to size after drying and before marketing. When the synthetic absorbent material is used for oil and grease and other liquid absorption on floors, round granules could cause trouble when walking on a layer of the material. Therefore, angular granules are needed from a safety standpoint, and for this purpose balls are formed of a relatively large selected size and are crushed to an angular or irregular form, then screened through the desired screen sizes, and then packaged or marketed in that form. Fines produced in the crushing step are fed back to a storage hopper, and when desired, up to 20% of fines or calcium sulfate dihydrate, and 80% calcium sulfate hemihydrate, or powdered gypsum plaster are mixed and fed into the disc.

In the process, the balls or granules of a desired size relative to the use for which they are manufactured, are forced out of the rotating disc by other balls that are growing in size, or have attained the desired size, they drop onto a moving belt, and they are carried into a dryer to be dried. The dried balls or granules are discharged from the drier, are generally screened to size, and then packaged.

The final synthetic gypsum liquid absorbent product made by the process of the present invention is provided in hard granules which are moisture absorbent, are of a relatively uniform density, and are relatively dustless, at least with respect to calcined clay granules prepared from fuller's earth as described herein and now used commercially for various absorbent purposes. For a given plaster being processed, density can be maintained substantially uniform for a given set of manufacturing or processing conditions for such synthetic absorbent product.

BRIEF DESCRIPTION OF THE DRAWINGS

FIG. 1a is a diagrammatic illustration of the remaining pieces of equipment to carry out the process, including a dryer, screens, and a crusher;

FIGS. 1 and 1a together not only illustrate the equipment but also show the flow of material in its various conditions through the complete process steps. The material itself is illustrated in a diagrammatic manner at different stages in the total processing.

DESCRIPTION OF THE PREFERRED EMBODIMENT

Figure 1:
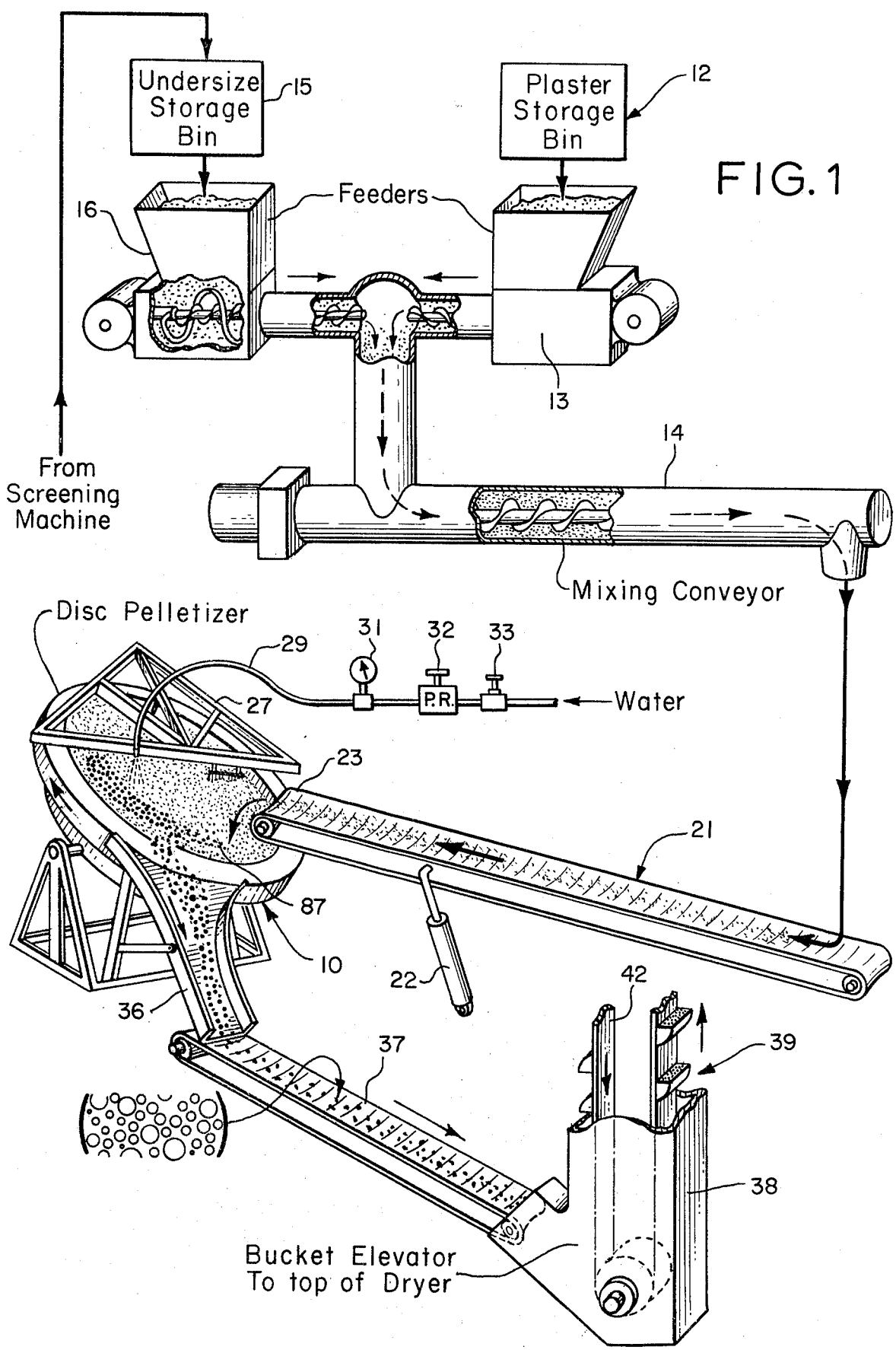
FIG. 1 is a diagrammatic illustration of equipment used in the practice of the present process including the rotary disc and directly associated pieces.

In starting up the process of the present invention, seeds are provided to the inclined disc in an amount such that some are ready to drop from the lower left quarter portion of the disc as viewed in FIG. 1. The seeds are balls or granules of assorted sizes such that approximately 95% will pass through a standard 6 mesh screen, they are graduated in size and segregated in proportions illustrated diagrammatically in FIG. 5, and include balls of a size of those to be manufactured from the dry plaster.

Generally, the necessary quantity of seeds is maintained in the disc at the conclusion of a production run for the day, but if the disc is being started up for the first time, the seed material can be formed from gypsum plaster or even from clay particles.

The seed material need not be in ball shape, and irregularly shaped or crushed granules of the ultimate desired size range can also be used. As the disc is rotated in a clockwise direction with the seed material, the latter distributes itself as per FIGS. 4, 6, and 7, and the eye forms substantially as illustrated in each and outlined in FIG. 7 with a heavy line. The speed of rotation as well as the inclination of the disc may be adjusted in order to get the desired pattern of movement for all of the material within the disc, and in order that the eye forms in the desired configuration and position in the disc.

Figure 4:
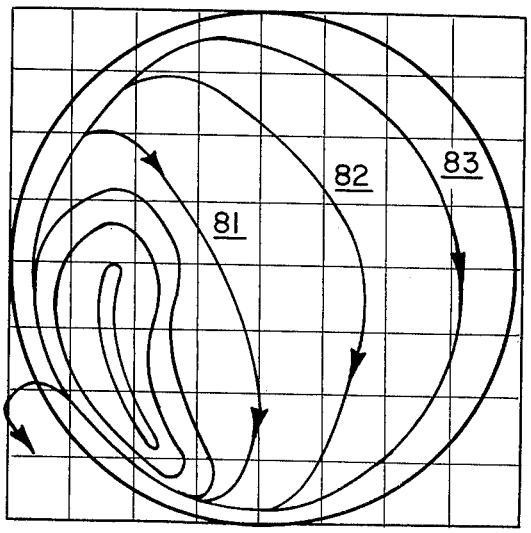
FIG. 4 is a top view of a typical movement pattern which the material in the inclined rotating disc assumes when mixing conditions are stabilized for granule production.
Figure 6:
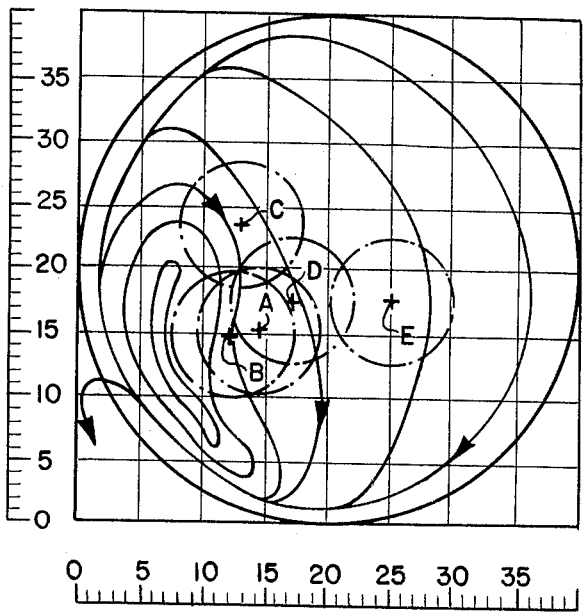
FIG. 6 corresponds to FIG. 4, but with different positions indicated for the water feed nozzle.
Figure 7:
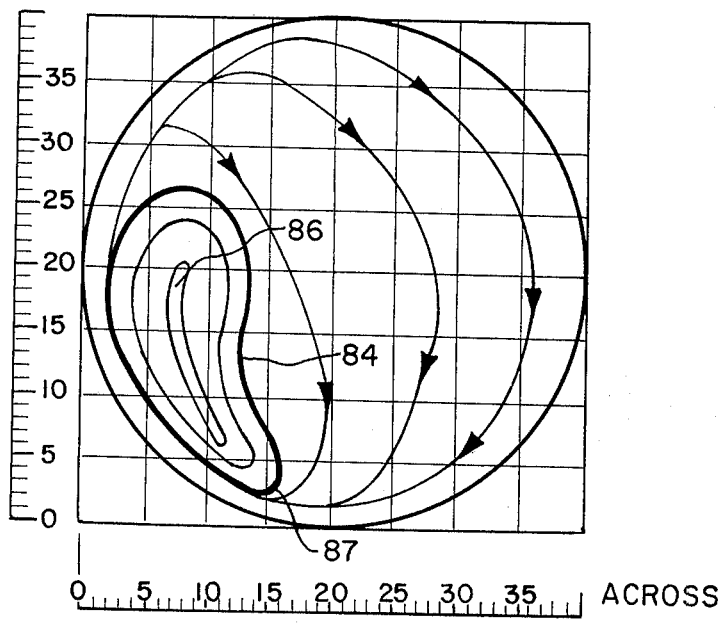
FIG. 7 is a duplicate of the moving material pattern of FIGS. 4 and 6 with a scale on each of two sides placed according to the 39 inch inner diameter of the disc, and outlining by a heavy line the so-called eye.

The "eye" is a loop in a kidney-shape wherein the material circulates as in a whirlpool, and the outside is defined by the heavy line in FIG. 7. The elongated narrow loop centrally of the eye will be referred to as the center of the eye. In order to have good balling action for the material in the disc, the material in the center of the eye in FIG. 4 moves at a relatively slow velocity which appears visually to be just sitting in that location. The material on the outside of the eye is moving at a much greater speed than that within the eye and forms a definite discernible loop at the base of the eye and a broader less well-defined pattern at the top of the eye. The arrowed lines in FIGS. 4, 6 and 7 illustrate diagrammatically the general paths for the flow of material within the disc and outside the eye.

When the desired moving pattern is attained, the seed material is sprayed with water in an amount that wets the seed granules but not so wet that such seed granules stick together, and in that desired condition they move relative to one another as the disc is rotated. If the eye changes in shape or size, adjustments in water feed, disc speed, or disc inclination are made until the eye position and configuration is acceptable from the visual observation of the operator and corresponds essentially to that in FIG. 7. If the seed granules tend to stick together they are too wet and the water spray is reduced in volume or changed to another location over the disc to spray the material at a different place or path as it moves in the disc. This starting up adjustment normally takes from 10 to 30 minutes to get a uniform acceptable pattern of movement for the seed material.

Figure 5:
FIG. 5 is a somewhat diagrammatic illustration in cross-section of the inclined disc essentially across the diameter of the disc from the point where granules are being discharged at the left side in the figure, with the balls or granules in a profile-like illustration showing the gradation and general size differences which prevail.

With the inclined disc containing seed granules rotating in a clockwise direction, with the gradation in size and the segregation of sizes corresponding generally to that in FIG. 5, the smaller sizes are to the right in the Figure or at the top of the disc and around the outside, and the larger sizes are near the bottom of the disc or at the left in FIG. 5. The top view in FIGS. 4 and 7 shows the general path of travel of the material by the arrowed lines, with the finer material in the outside path to the right, and with the coarser material or larger granules in the two paths to the left of the right outside path. The largest granules are in the path leading to the point of discharge from the disc indicated by an arrow at the lower left quarter portion of FIGS. 4 and 6.

As a general observation, the speed of rotaton is determined to be too great when the centrifigal force moves too much material to the outside as compared with the general distribution shown in the profile of FIG. 5. At such speed there are little or no granules at the center of the disc. If rotation is too slow, the loop as shown at the base of FIG. 4 has a poor visible formation and there is little material in the outer portions of the paths illustrated.

If the inclination of the disc is changed from 40°, for instance, to a more extreme angle, or it is reduced to a more horizontal position, there is improper distribution of materials just as for opposite extremes in speed of rotation. If too steep, there is not enough material retained in the disc for proper growth of the balls or granules, there is no well defined eye, and the retention time of material in the disc is not long enough to form balls or granules of a desired size. Contrary wise, at a more horizontal position the size distribution deteriorates, and balls do not form and grow properly. When the rotation of the inclined disc is stopped, then the pattern of movement discussed above is lost, for the material slides or drops to the bottom of the inclined disc.

Ball formation and growth of the balls or granules of the present invention in the rotating disc follow generally that described above so far as the pattern of movement is concerned. When powdered dry gypsum plaster is fed to the seed material in the rotating disc and water is sprayed thereon, the drops of water from a spray nozzle come in contact with the powder to form new, very small balls. The new small balls migrate to the outside of the disc. The water from the spray wets these balls as they move under the spray and they each collect dry powdered plaster or other small balls and thus grow to the desired size to be discharged from the disc.

The spray nozzles used in the illustrated equipment are those of Spraying Systems Company of Bellwood, Ill., and are identified as nozzle TG1 for the non-adjustable nozzle, and X5000 for the nozzle which is adjustable so far as the volume of water sprayed is concerned, and the fineness or coarseness of that spray. The TG1 nozzle or tip has only one size opening. The initial ball formed is correspondingly small or larger depending upon the fineness or coarseness of the drops of water emitted from the nozzle.

More specifically, the initial ball so formed can grow in size by (a) collecting the fine powdered plaster on its wet surface, much like a snowball grows as it rolls through a field of snow, or (b) by gathering together other small balls or small seeds from the seed material while the latter is in the disc, much like a popcorn ball. In the present process it appears that the latter method of growth is most common, and the end product is a very suitable absorbent. Also, (c) there may be growth by a combination of (a) and (b) wherein the small balls or seeds seem to be embedded in a matrix of plaster, but these latter balls tend to be heavy and are the least desirable of those here described.

Figure 3:
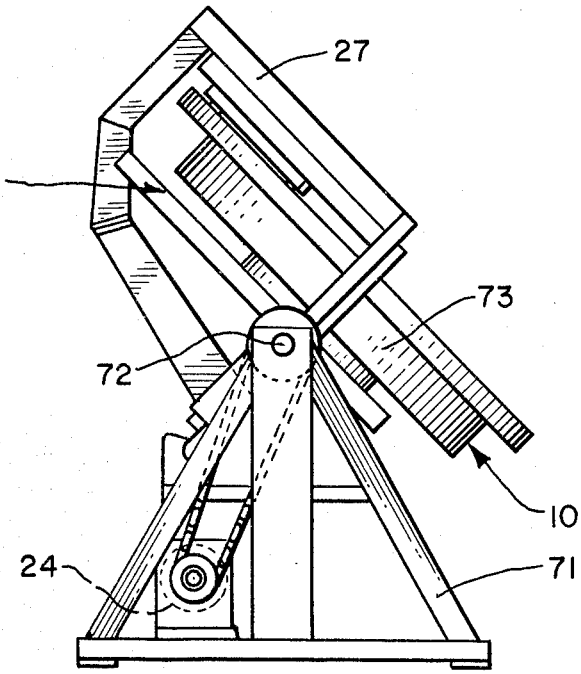
FIG. 3 is a side view of the same.

The rotary disc employed in the ilustrated system is a thirty-nine (39) inch disc manufactured by Dravo Corporation of Pittsburgh, Pa. and such disc is adjustably mounted as shown in FIG. 3 so as to change the angle of inclination relative to the horizontal. It has a variable drive so that the speed of rotation of the disc can be varied. The angle of inclination and the speed of rotation of the disc are important in effecting the formation of the eye, and in the retention time of the moving material in the disc. In turn, these operating conditions are important in the character and size of the granules formed in the disc.

Figure 2:
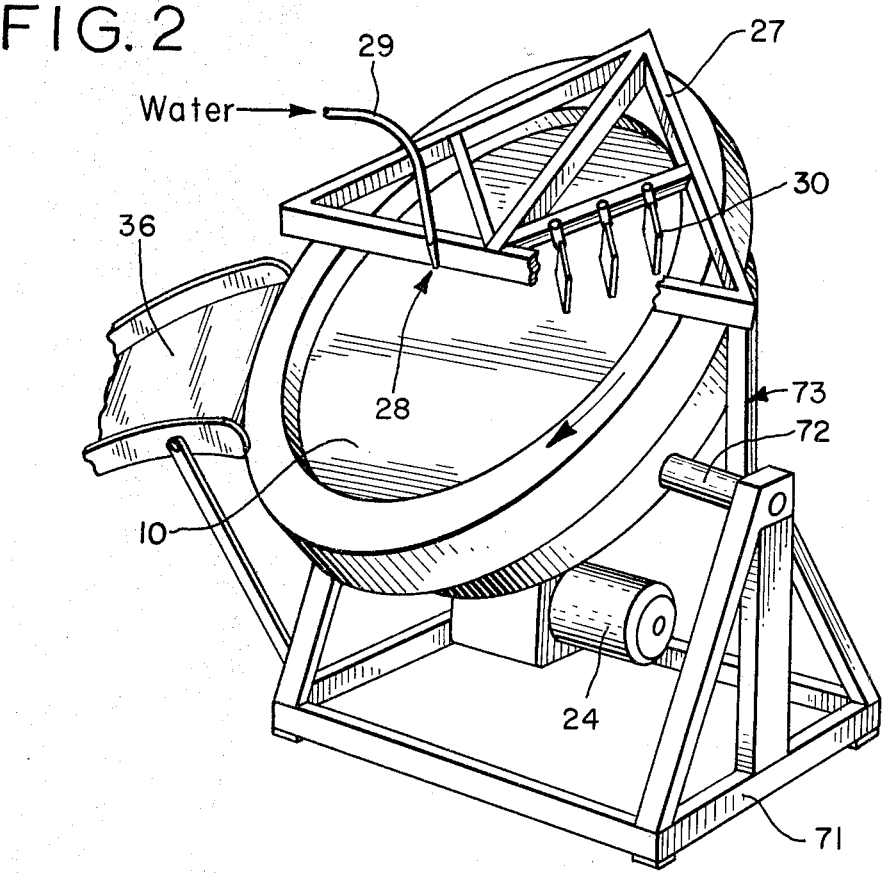
FIG. 2 is a front perspective view of a portion of the rotary disc equipment of FIG. 1.

Referring now to the drawings; the principal piece of equipment for the complete system employed in practicing the process of the present invention is the disc 10 in a pan form which is illustrated in more detail in FIGS. 2 and 3, wherein the balls or granules of synthetic absorbent material are produced from gypsum plaster or calcium sulfate hemihydrate and water. An important feature of the present invention utilizing this equipment is the fact that standard commercial types of such plaster can be processed, and the process can accomodate variables that occur during the mixing with water and that occur as the plaster hydrates without seriously interrupting a full production run with that particular plaster.

Numerous different such plasters have been used and the EXAMPLES given herein are production runs employing different commercial grade or type plasters from different geographical locations in the United States and in England.

The British company is British Gypsum Ltd. of London, England, and the American company is U.S. Gypsum of Chicago, Ill. The specific plasters with specifications were given above.

Although the plaster was purchased in 100 pound bags, plasters purchased in the bulk and in amounts of 15 tons of plaster will lend themselves to the same formulation as will be hereinafter described. The manufacturers provide specifications with each type of plaster such as those described above, but it has been found that the process steps to be described permit adjustment in the system generally and in an operation without any reference to the manufacturers' specifications. The gypsum plaster is calcium sulfate hemihydrate and in the course of the processing the plaster, it is hydrated and becomes calcium sulfate dihydrate. The latter is considered equivalent to the naturally occurring gypsum so far as the chemical composition is concerned, but the dihydrate has a liquid absorption characteristic not found in the naturally occurring gypsum from which the plaster is made.

Dry powdered plaster is provided in the storage bin 12, and the plaster moves from such bin to variable feeder 13 and to mixing conveyor 14. The material is metered by weight for use in the disc 10, and the mixing conveyor 14 either moves the material wholly from bin 12, or moves a mixture of plaster from bin 12 and undersized calcium sulfate dihydrate from bin 15 which respectively come through variable feeders 13 and 16. The dry material, whether from bins 12 and 15, or from one of the two, is fed to a moving conveyor belt 21, which is adjustable to allow discharge of dry feed material to various locations over the disc 10. The feeders 13 and 16 can each be adjusted so that the desired proportions of dry material can be fed in a controlled manner from the bins 12 and 15 respectively through the mixing conveyor 14 to the adjustably positioned belt 21. A conventional mount 22 diagrammatically illustrates a support for the belt 21 in FIG. 1, and permits adjustment of the position of the feed end of the belt 23.

It should be understood that material from bin 15 is mixed with plaster and fed to the disc 10 only when it is desired to use the dihydrate in a recycling operation. As all of the EXAMPLES will demonstrate, there is not the excess amount of fines in the practice of the present process that there is in the preparation of mineral clay absorbent to granule form for marketing. Accordingly, it is contemplated that in a normal commercial operation most of the material synthesized will be gypsum plaster alone.

An open rack 27 mounted on the disc equipment supports the plows 30 which act to prevent an undesirable buildup of material from forming on the bottom of the disc 10. A water feed or nozzle 28, connected to a flexible water line 29 is self-supporting and permits the nozzle 28 to be adjusted to different positions over the disc. A grid of wire mesh which is not shown in the drawings has also been used on the rack 27 so as to support the flexible line 29 in very specific adjusted positions to correspondingly spray water through nozzle 28 onto the moving material in the disc. The line 29 also includes therein a meter 31 to register the water pressure or volume, and valves 32 and 33 for varying the water pressure or volume in the line to the nozzle 28 and maintain a constant water supply to the balls or granules in the disc and to the powdered plaster from which the balls are formed and grown.

In the equipment illustrated and used for the practice of this process, the nozzle 28 with a standard size spray opening is identified as a TG1 nozzle. An adjustable spray nozzle identified as X5000 type has also been used, wherein the adjustment of the particular water spray is accomplished directly at the nozzle. This is not illustrated but is identified hereinafter in EXAMPLES.

Before describing the mixing and ball growing process and the adjustments to be made to obtain the desired ball or granule size and composition before they are discharged from the rotating disc 10 into a spout-like part 36, the remainder of the equipment will be described as illustrated diagrammatically in FIGS. 1, and 1a.

The balls or granules are dropped from the rotating disc on to a conveyor belt 37 when fully formed and when pushed out by other balls or granules being formed and growing in the disc. The belt 37 discharges into a bucket elevator 38 with buckets 39 mounted on a belt 42 therein driven by a motor 41 (FIG. 1a). Actually, to avoid damage to the balls or granules the buckets are filed directly from the conveyor 37 and are carried in the direction of the arrow shown at the bottom of FIG. 1 and at the top of FIG. 1a. At this stage in the process the balls or granules are hard enough to be handled in the equipment but must be dried to remove excess water therefrom. The buckets 39 discharge the balls onto another conveyor belt 43 (FIG. 1a) which dumps the same into a hopper 44 for the dryer 46. The belt 43 in FIG. 1a has protrusions which maintain the finished balls thereon for dumping and keep the hopper 44 evenly full.

The dryer 46 illustrated with broken away portions in FIG. 1a and utilized in this system is a conventional dryer used for agricultural products wherein hot driven air is forced into the dryer from the blower and heater 47 into and through the chamber 48 in which the granules are either slowly moving or are maintained in a single position for the necessary elapsed time until they are discharged at bottom outlet 49 onto another belt 51. The temperature in the dryer 46 does not exceed the dehydration temperature of the gypsum which is about 250° to 300° F., so as not to disturb the dihydrate chemical composition of the granules.

The belt 51 conveys the dried and hardened granules to a series of standard mesh screens 52 and 53, and to a pan 54 that collects the granules going through screen 53. The screens are removably mounted on a vibrating frame and may be provided in any desired screen size within the desired range for the granules to be produced as the end product from a particular manufacturing operation, and in any number desired. For instance, screen 52 can be of 6 mesh size wherein all granules that go through the same are thereby sized as a maximum, and those retained on the screen 52 are larger than the screen mesh will pass. These larger balls or granules are conveyed to a crusher illustrated diagrammatically at 56 wherein the oversize granules are crushed to a smaller size and the crushed material is recirculated back to the screens 52 and 53 and either are retained or go through a graduated selection of granule sizes for the different end product uses. Those going through screen 53 and into pan 54 are classified as "fines".

The granules that are retained on screen 53 which could be a standard 60 mesh screen represent the granules desired for a particular end product from that manufacturing operation. These are conveyed to a product storage bin 57 as illustrated by the correspondingly marked box. It is understood that FIG. 1a is simply illustrative of a screen and storage system, for other screens can be provided and there can be a conveyor from each screen to a storage bin as bin 57 or any combination of screens, bins, and conveyors which will satisfy the needs of a particular system practicing this process.

Synthetic granules passing through screen 53 and retained on pan 54 are of a smaller size and if it is desired to market the same in that smaller size but with variable size granules within the collection, such a combination can be marketed. Fines retained on pan 54 which have no market use are conveyed to a so-called UNDERSIZE storage bin identified by such words in FIG. 1a, and shown diagrammatically as bin 15 in FIG. 1. The present invention can use such fines recycled with dry powdered plaster in selected proportions.

Granules of a different size, and variable in shape are illustrated somewhat diagrammatically within brackets at 58, 59, 61, 62 and 63. Those granules illustrated in the bracket at 59 can be the large balls which do no go through screen 52 and are returned to the crusher 56 after which they come out in an irregular shape and smaller in size as illustrated by those at bracket 58. When the crushed granules are returned to the screen 52 some or perhaps all will pass through the screen 52, depending of course upon the size thereof, and the mix then will look like those illustrated in the bracket at 61 with the round granules which also pass through screen 52 in the first instance. The irregular granules pass through that screen on a second screening operation after crushing. As illustrated for screen 53 in bracket 62, those collected at such screen could all be round in configuration as having passed through the screen 52 in the first instance and retained on screen 53, but could vary in size. The small granules illustrated in the bracket 63 are those retained on the pan 54 and conveyed to a bin for storage purposes from which they are recycled as undersized dry feed material, but as a dihydrate. There might also be some marketable use for such granules depending upon their size.

With respect to the storage bin 15 and undersized granules, it has been found that as much as 20% of the total weight of material being fed into the disc can be these undersized granules or fines. In feeding this amount back into the main mixing stream, they can be utilized and do not have to be disposed of as a waste product. Furthermore, it appears that fine hydrated material such as these undersized granules or fines affect the rate of hydration during mixing in the disc, whether the fines have accumulated in the disc or whether the fines are fed with dry powdered plaster to the disc in recycling the fines. It appears that the dihydrate fines are acting as an accelerator and causing more rapid hydration of the plaster or calcium sulfate hemihydrate being mixed with water.

With respect to further details of the disc apparatus as illustrated more specifically in FIGS. 2 and 3, the frame 71 normally stands on the floor in the factory building and includes a support 72 for a frame 73 in which the disc pan 10 is mounted and in which the latter rotates. The frame 73 can be adjusted to the desired inclined angle which affects the movement of the material within the rotating disc 10 and brings about a segregation of different ball or granule sizes as illustrated diagrammatically in FIG. 5 of the drawings. The motor 24 is connected to the disc 10 and rotates the same in a clockwise direction as shown by the arrow in FIG. 2, with the frame 27 positioned over the disc and supporting not only the water line 29 and nozzle 28 but scrapers or plows 30 which prevent an improper accumulation of material in the bottom of the disc or pan. This can occur if the powdered material and water being mixed to form balls or granules instead of moving in a normal manner within the disc sticks to the bottom and must be scraped off to move the same into the natural flow of material.

The rotating disc operates by continuous displacement of the balls or granules with the very small granules generally moving around the upper and outside portion of the rotating disc, and the balls or granules as they grow being displaced toward the point of discharge at the lower left quarter portion of the disc through the outlet 36. At this point and time the balls or granules are at their maximum desired size. Although the frame 27 is fixed over the disc, in the practice of the present invention a wire screen with holes therein 1" square is placed on the frame so that the water line 29 nozzle 28 can be moved from spot to spot in selected increments. Thus, the position of the water feed can be accurately located for purposes of the adjustments illustrated by letter references in FIG. 6, which will be described. Such a screen on the frame is not illustrated but it can be visualized from the scales both up and down and across shown for the 39 inch diameter disc in FIGS. 6 and 7.

FIGS. 4 to 7 inclusive will be described particularly as related to the items in the table below for EXAMPLE 1 wherein the system was operated according to the present invention for seven (7) Samples, each one being a complete production operation and all being performed with Gothan type gypsum plaster purchased from British Gypsum in London, England, and shipped to a facility operated by the assignee of the present application at Prairie View, Ill. The manufacturer's specification supplied for this plaster was given previously in the present specification. The table for EXAMPLE 1 is noted hereinafter immediately following the description of Samples 1 to 3 inclusive, and the remaining four Samples will be described following such table.

Sample 1 of EXAMPLE 1 will be described as though the process was started up from scratch. Seed material was put into the disc to a depth approximating that for the balls or granules illustrated in the cross-section of FIG. 5 wherein the left hand portion of the disc in FIG. 5 corresponds to the lower portion as shown in FIG. 1 with the largest balls being discharged into the spout or ramp 36. The seed material for the operation of the present process is normally made up of balls or granules left in the pan at the conclusion of a prior operation, and is made up of balls substantially of the size of those to be produced in the impending operation. Inasmuch as the system was being prepared for operation according to Sample 1, the size mix for the seeds corresponded generally to the screen mesh sizes under the heading BALLS RETAINED ON SCREEN MESH wherein approximately half of the output was retained on the 20 mesh screen and half was retained on the 6 mesh screen.

If there is nothing left over in the disc from a prior operation when starting up a new operation, the seed balls can be prepared from any readily available dry powdered plaster material in steps such as those for a manufacturing operation to produce new granules. Then the grown seed material in graduated sizes to form a profile such as that illustrated by the granules in FIG. 5, is provided in the inclined disc. The disc is rotated and water is sprayed onto the seeds. The pattern of movement corresponds to the arrowed lines 81, 82 and 83. The "eye" 84, as it is called, is defined by a heavy line in FIG. 7, and the patterns of movement and eye are illustrated in the same way in FIGS. 4, 6, and 7. The material in the disc moves somewhat like a whirlpool, is irregular in shape and is somewhat kidney-shaped at the eye 84. The center portion 86 within the eye is clearly visible in the disc.

When the seed material was distributed in the rotating disc corresponding generally to that in FIG. 5, and an eye was formed as in FIG. 7 within the moving seed material, it was considered to be stabilized and the water was turned off but the disc rotated. The feed end 23 of the conveyor belt 21 was positioned approximately over the base 87 of the eye as shown in FIG. 1 and as shown by that reference numeral in FIG. 7. The water nozzle 28 was positioned at point A in FIG. 6. The water was turned on, and the plaster was fed from the storage bin 12 and conveyed by feeder 13 and conveyor 14 to the belt 21 and into the disc 10. The locations of the water and the plaster feeds, the angle of inclination and speed of rotation of the disc and the rates of delivery of the water and the plaster feed are all given in the table for Sample 1. Also, the size and characteristics for the manufactured granules are given.

The run or operation represented in Sample 2 is provided in the following table and described herein to show how ball or granule size as well as the absorptive properties can change with the same plaster in the disc and with the same settings for the various operating conditions specified in the table. This change occured during the operation of Sample 1 and emphasizes that variables in the same gypsum plaster will occur. Each operation for Samples 1 and 2 was carried on for approximately one-half hour, and the processed synthetic absorbent material from each run had somewhat the same characteristics as shown in the table. However, the size of the balls or granules varied, for as noted in Sample 1, 50% of the balls were retained on the 6 mesh screen while in Sample 2 only 4.5% were retained on that size screen. Twice as much of the material from Sample 2 was retained on the 20 mesh screen as for that screen in the Sample 1 operation. The balls or granules were usable, but the change in size for the Sample 2 run necessitated an adjustment to get the ball size back approximately to those in the Sample 1 operation. Actually, a change in the balls or granules was visually observed during Sample 2 operation. They were getting smaller and appeared to be too dry. The reason for this was not ascertained, and the adjustment in reducing the plaster feed in effect increased the water feed for the lesser amount of plaster.

Such adjustment is shown for Sample 3 in the table, for the plaster feed rate was reduced from 3536 grams per minute to 3378 grams per minute, and the Sample 3 operation with the plaster material identified as the same grade or type by the manufacturer fed into the disc resulted in substantially the same relative gradation in granule size as for Sample 1.

During the approximately 30 minute operation for Sample 2, it was found visually, as stated above, that the balls were smaller. Also, the movement pattern changed and lost its uniformity. The plaster feed rate was reduced and uniformity returned to the movement pattern. The granules being produced in Sample 2 were screened, as were those from Sample 3, and the comparative characteristics and sizes for the granules from Samples 1 to 3 inclusive are shown on the table.

EXAMPLE 1

| EXAMPLE/ SAMPLE | 1/1 | ½ | ⅓ | ¼ | 1/5 | 1/6 | 1/7 |
|---|---|---|---|---|---|---|---|
| TYPE OF PLASTER | BRITISH GOTHAN GYPSUM | | | | | | |
| OPERATION OF DISC: | | | | | | | |
| Angle of disc (degrees from horiz.) | 40 | 40 | 40 | 40 | 40 | 40 | 40 |
| Speed of disc (RPM) | 19 | 19 | 19 | 19 | 19 | 23 | 23 |
| Location water spray (up in.) | 15 | 15 | 15 | 15 | 24 | 17 | 17 |
| Location water spray (cross in.) | 14 | 14 | 14 | 12 | 13 | 16 | 25 |
| Flow rate of water (ml/min.) | 850 | 850 | 850 | 850 | 850 | 850 | 850 |
| Spray height above disc bottom (in.) | 7 | 7 | 7 | 7 | 7 | 7 | 7 |
| Area covered by spray (in.) | 10 | 10 | 10 | 10 | 10 | 10 | 10 |
| Type of nozzle | TG1 | TG1 | TG1 | TG1 | TG1 | TG1 | TG1 |
| Location of plaster feed | BASE OF EYE | | | | | | |
| Feed rate of plaster (gms/min) | 3536 | 3536 | 3378 | 3378 | 3378 | 3378 | 3378 |
| Feed height above bottom of disc. (in.) | 10 | 10 | 10 | 10 | 10 | 10 | 10 |
| Position of water spray (FIG. 6) | A | A | A | B | C | D | E |
| PRODUCT DATA: | | | | | | | |
| Bulk density (lbs./cu. ft.) | 46 | 45 | 47 | 46 | 45 | 43 | 44 |
| Water absorption (% of wt.) | 40 | 46 | 34 | 34 | 34 | 62 | 70 |
| Oil absorption (% of wt.) | 30 | 36 | 26 | 28 | 26 | 58 | 60 |
| BALLS RETAINED ON SCREEN MESH: | | | | | | | |
| Size No. - 2 (All are % of wt.) | 0 | 0 | Nil | Nil | Nil | 0 | 0 |
| 4 | 0 | 0 | 4.7 | 16.9 | 1.3 | 0 | 0 |
| 6 | 50 | 4.5 | 46.7 | 52 | 71.5 | .1 | .1 |
| 20 | 48.2 | 95.2 | 46.3 | 31 | 27.2 | 87.6 | 76.1 |
| 60 | 1.0 | .1 | 1.0 | .1 | .1 | 11.0 | 22.4 |
| Pan | .6 | .2 | .4 | .1 | .2 | 1.0 | 1.0 |

It was desired to increase the volume of the larger size balls or granules, and the nozzle 28 was moved from position A to position B in FIG. 6, which was essentially at the right hand edge of the eye. This position is shown in the table for Sample 4 which references such operation. Except for this change, all of the operating conditions remained the same as for Sample 3, and the product characteristics themselves were essntially the same as those for the stabilized run of Sample 3. However, with the water spray delivered at position B (FIG. 6), and hence nearer the eye, the percentage retained on the large 4 mesh screen size increased more than 3 times, while the balls or granules on the finer 20 mesh screen decreased from 46.3% to 31% in Sample 4.

After operating the disc according to Sample 4 for approximately one-half hour and with the operation stabilized, it was desired to have the major percentage of the balls large. The disc was stopped and the water spray was moved to position C in FIG. 6, which is identified in the table for Sample 5 of EXAMPLE 1. The disc was started up and in about ten minutes, the operation stabilized and was then run for approximately thirty minutes in the stabilized condition. The percentage of larger granules retained on the 6 mesh screen increased materially for this run relative to the size produced in Sample 4.

In order to reduce the size of the majority of the balls or granules, the nozzle for the water spray was moved to position D in FIG. 6 as reflected in Sample 6 of EXAMPLE 1. Again there was a start up time, and with the pattern stable the operation with the operating conditions in the table for Sample 6 was carried out. As noted under BALLS RETAINED, the granules retained on the 6 mesh screen decreased from 71.5% down essentially to 0, while the volume of smaller granules retained on the 20 mesh screen increased more than 3 times, and those retained on the 60 mesh screen jumped to 11% from practically 0.

After running the operation according to the Sample 6 specifications in a stabilized condition, it was desired to make the majority of the balls or granules still smaller in size. The water spray was moved 9 inches to the right over the disc to position E in FIG. 6. In this position as noted in the Sample 7 table, the balls or granules on the 2, 4, and 6 mesh screens substantially disappeared, those retained on the 20 mesh screen were reduced in amount, and those on the 60 mesh screen doubled percentage wise.

It is evident in FIG. 6 that the points A to E for the water nozzle in Samples 1 to 7 have a relationship to the eye 84, and particularly to the center 86 of such eye, and such points in turn have a relationship to the position 87 for the dry plaster feed to the disc. When the disc is filled with seed material, as previously described, the water spray is started at a set position approximating point A in FIG. 6, and the plaster feed is started in a position at the base 87 of the eye 84. The dry powdered plaster when introduced into the inclined rotating disc follows a path along the left side of the disc as viewed in FIGS. 1, 4, 6, and 7 and down the path illustrated generally by the arrowed line 81 through the point D.

Meanwhile, the wet seed material has picked up dry plaster, and the seed granules grow as they travel in the disc. Also, each droplet of water in the spray picks up one or more powdered plaster granules which are very fine particles, and these follow the same path. This is not a sharply defined uniform path in a geometrical sense, for the eye 84 which is the whirlpool of material in the disc is not precisely symmetrical continuously. As rotation continues, the seed granules grow and are pushed out of the disc at the bottom quarter portion into the outlet or spout 36, and balls formed from new plaster material introduced into the disc likewise grow and are forced to the left and up and out at the same quarter portion. New balls formed from the plaster, while small or very small take a path up and to the right as indicated by the arrowed lines 82 and 83, and are segregated as illustrated in profile in a graduated manner in the cross section FIG. 5. In such cycling movement, part of the dry material being fed into the disc follow a path extending approximately through point D in FIG. 6, which is surrounded by a circle representing the outline for the water spray from the nozzle at D. Such circle touches some part of every other circle in that figure illustrating the area covered by the water spray at each other nozzle position noted. Part of the dry material in such path is the basis for new tiny balls which take the outside path down and up and to the right in a clockwise direction in FIG. 6.

The clockwise path taken by new balls as they grow, and particularly on the first cycle, generally extends through the water spray whether the water nozzle is at A, B, C, D, or E. The adjustment of the position for the water spray controls the ultimate size of the balls or granules produced. In other words, by changing the position of the water spray, with all other operating conditions essentially the same, the size of the ultimate balls or granules is changed, and the Samples of EXAMPLE 1 show that the size change of the balls or granules can be either to those larger or smaller, relative to the size before the change.

The positions of the water spray nozzle at D and E in FIG. 6 and as referred to in Samples 6 and 7, show that the size of the balls or granules decreases as the water spray is moved to the right over the disc and away from the eye. The results of the operations noted as Samples 4 and 5 show that the size of the balls or granules increases as the water nozzle and hence spray is moved toward the eye. There is the largest retention on the 6 mesh screen for those two operations.

Samples 4 and 5 granules are coarse, the bulk density is at an upper part of the range and absorption is at a lower part of the range. However, the granules from Samples 6 and 7 are fine and are at a lower part of the range shown in the table for EXAMPLE 1, and absorption is at the higher part of the range shown. The plaster used in the EXAMPLE 1 production runs was all from British Gypsum and all the same commercial grade or type.

With reference to the uses for the products of EXAMPLE 1, the present synthetic absorbent used for cat boxes can be in a range from that passing through 4 mesh screen to that retained on 60 mesh screen, and hence essentially all of that produced in EXAMPLE 1 is useful for that purpose. That shown in bracket 62 of FIG. 1a is illustrative of the range. For all of such granules produced and dried, such end use for cat boxes could be determined from visual observation from the runs of EXAMPLE 1, and they would not have to be screened in preparing them for marketing. The amount of fines shown in the pan in the table is insignificant when included with the granules for any one of the Samples and would not have to be screened out or removed in some other way if production is for cat box synthetic absorbent.

That from Sample 3 is somewhat coarser, and that retained on the 4 and 6 mesh screens could be crushed and screened for ultimate use in absorbing undesirable oil, grease and other liquids in industrial locations as previously described herein. That retained on the 20 mesh screen could be combined with that crushed and uncrushed as per the illustration in bracket 61 of FIG. 1a, and marketed as a cat box absorbent. The same use could be made of that from Sample 4. Sample 5 of EXAMPLE 1 is illustrative of the product from a run where all could be combined for use as a cat box absorbent, and such use could be visually determined without screening for there is also very little in the way of fines.

The same use could be made of that from Sample 6, for it is essentially all 20 and 60 mesh size, and of that, the great majority is 20 mesh.

For the Sample 7 production, the 22.4% in granules could be screened out for use as carriers for agricultural chemicals and the 76% would be used as cat box absorbent.

EXAMPLE 2

One of the purposes of this operation was to obtain synthetic absorbent granules for oil, grease, and other liquid absorbent purposes. As has been described, the granules for this purpose are preferably angular rather than round as illustrated in bracket 57 with FIG. 1a, and the balls or granules were to be made to a size generally greater than those passing through the 6 mesh screen for crushing to get the angular shape. However, balls or granules were also formed that corresponded in size to cat box absorbents and on the first screening they were segregated to be used directly in that shape and size without other processing.

In starting, the disc 10 was filled to the general level and with seed material of mixed sizes as illustrated in FIG. 5 from balls or granules made previously with Newark gypsum plaster which had been purchased and shipped from British Gypsum Company. This seed material was of a general size range which would pass through 6 mesh screen and be retained on a 60 mesh screen, and the various pieces of equipment were initially set approximately to the conditions of EXAMPLE 1, Sample 1. The water was turned on with the disc rotating, and the disc was operated until the configuration for the movement of the seed material in the disc stabilized essentially the same as that shown in FIGS. 4, 6 and 7 with a well-defined eye. At that time, the water spray was turned off, and the settings shown in the following table for EXAMPLE 2 were effected.

All operating conditions and equipment for the process were set in motion and material in the disc stabilized in a short time at the conditions noted in the table. In such stabilized stage the seed balls grew and were gradually discharged and the new balls or granules were formed from the mixture of plaster and water and also were discharged at the full desired size. The balls or granules were dried and then screened. Those retained on the 4 and the 6 mesh screens were crushed and then rescreened at which time those which passed through the 6 mesh screens and those retained on the 60 mesh screen were combined into the volume for marketing as an absorbent for undesirable oil, grease and other liquid accumulations in industrial locations. These corresponded generally to those illustrated in bracket 61 in FIG. 1a.

Meanwhile, on the first screening those dried balls or granules that passed through the 6 mesh screen and those retained on the 60 mesh screen were not sent to the crusher but were collected and used for marketing as cat box absorbent granules.

As noted in the following table the bulk density for the crushed balls was slightly higher than the average for the uncrushed balls as originally made, while the water absorption factor was greater for the crushed than the uncrushed. Inasmuch as oil absorption is not a factor for cat box absorbent, such reading was not taken for the uncrushed balls or granules. cl EXAMPLE 2

| EXAMPLE/SAMPLE | 2/1 |
| --- | --- |
| TYPE OF PLASTER | BRITISH NEWARK GYPSUM |
| OPERATION OF DISC: | |
| Angle of disc (degrees from horiz.) | 40 |
| Speed of disc (RPM) | 20 |
| Location water spray (up in.) | 13 |
| Location water spray (cross in.) | 15 |
| Flow rate of water (ml/min.) | 740 |
| Spray height above disc bottom (in.) | 7 |
| Area covered by spray (in.) | 10 |
| Type of nozzle | TG1 |
| Location of plaster feed | BASE OF EYE |
| Feed rate of plaster (gms/min) | 2000 |
| Feed height above bottom of disc. (in.) | 10 |
| PRODUCT DATA: | |
| Bulk density (lbs./cu. ft.) | 43 |
| Water absorption (% of wt.) | 57 |
| Oil absorption (% of wt.) | 30 |
| BALLS RETAINED ON SCREEN MESH: | |
| Size No. - 2 All are % of wt.) | Nil |
| 4 | 1.4 |
| 6 | 51.1 |
| 20 | 45.3 |
| 60 | 1.0 |
| Pan | 1.2 |
| Crushed Balls (Pass thru 6 mesh Retained on 60 mesh.) | |
| Bulk density (lbs./cu. ft.) | 47 |
| Water absorption (% wt.) | 58 |
| Oil absorption (% wt.) | 56 |
| Uncrushed Balls (Pass thru 6 mesh Retained on 60 mesh.) | |
| Bulk density (lbs./cu. ft.) | 44 |
| Water absorption (% wt.) | 40 |
| Oil absorption (% wt.) | |

EXAMPLE 3

This series of three operations (Samples) utilized gypsum stucco, which is also calcium sulfate hemihydrate, purchased from U.S. Gypsum Company that had been processed in Jacksonville, Fla.

The Sample 1 operation was set up with seed material as generally described for EXAMPLES 1 and 2. However, it was desired to produce finer synthetic absorbent balls or granules than those of EXAMPLE 2, for instance, and the gradation in size for the seeds was correspondingly finer. To illustrate the effect of a finer water spray applied to the material in the rotating disc an X5000 nozzle was used which enabled the operator to adjust the condition of the spray, but it also could be set for a finer spray than the TG1 nozzles.

With the nozzle positioned 16 inches to the right and hence displaced from the eye of the material formation, and a lower volume of water flow and a correspondingly lower feed rate for the dry stucco, the operation was stabilized at 450 milliliters per minute for water flow, and 1200 grams per minute for the dry plaster feed. As a result more than 80% of the balls or granules were retained in the 20 mesh and the 60 mesh screens, and almost 18% passed through the 60 mesh screen to the pan. This was too fine for absorbent purposed and was returned to the undersize storage bin for recycling, as explained previously in this specification.

The 26.8% which was retained on the 20 mesh screen was directed from the screen for marketing as a cat box absorbent, and the 55% retained on the 60 mesh screen was used as a carrier for agricultural chemicals. Hence, the total production was finer than the granules produced in the previously explained EXAMPLES. The bulk density for the run or operation was lower, and the water and the oil absorption capacities were higher.

The EXAMPLE 3, Sample 2 operation used a TG1 nozzle and produced a coarser water spray. The stucco or plaster feed rate was increased, but except for these two changes, the conditions were the same as for Sample 1. When the operation was stabilized at the conditions of the following table, the final balls or granules represented a choice for ultimate use. Those retained on 6 mesh screen could be crushed, rescreened, and then used for oil, grease and other undesirable liquid absorbent purposes, and those retained on the 20 mesh screen could be used as they came from the screen for cat box absorbent, or the two could be combined directly from the screens to provide a mix as illustrated diagrammatically in bracket 62 in FIG. 1a, and also used for cat boxes.

Sample 3 of EXAMPLE 3 is illustrative of the balls or granules from an operation wherein a TG1 type nozzle was moved to the right of the Sample 2 position over the disc as viewed in FIG. 6, for instance, and substantially the entire production was sized at the 20 mesh screen. This entire production including a small amount that was smaller, and an even smaller amount that was larger was combinable and usable for cat box absorbent as it came from the screens and the pan. The latter amount in fines was not objectionable in the total mix.

Considering the balls or granules produced and referenced in EXAMPLES 1 to 3 inclusive, it is noted that with all of the various operating conditions and the resulting different absorbent products of different sizes and different characteristics, there was very little collected in the pan for recycling or as waste. In fact, it was only for the run of EXAMPLE 3 Sample 1, wherein a predominance of small sizes was desired that there was a noticeable accumulation screened out as fines for this passed through the 60 mesh screen. As has been pointed out, it was either used for recycling with new dry powdered plaster, or became waste. In the manufacture of absorbent granules from fuller's earth or from other acceptable absorbent clay minerals, the resulting fines are generally at least 20% of the total production, and these are generally wasted and represent a cost for disposing of them. Accordingly, another significant economic advantage for the synthetic absorbent of the present invention is evidenced, for not only is the production of fines significantly less, but here the fines can be recycled up to 20% by weight of the total feed to the disc.

EXAMPLE 3

| EXAMPLE/SAMPLE | 3/1 | 3/2 | 3/3 |
|---|---|---|---|
| TYPE OF PLASTER | U.S. GYPSUM JACKSONVILLE STUCCO | | |
| OPERATION OF DISC: | | | |
| Angle of disc (degrees from (horiz.) | 40 | 40 | 40 |
| Speed of disc (RPM) | 20 | 20 | 20 |
| Location water spray (up in.) | 13 | 13 | 13 |
| Location water spray (cross in.) | 16 | 16 | 20 |
| Flow rate of water (ml/min.) | 450 | 450 | 450 |
| Spray height above disc bottom (in.) | 7 | 7 | 7 |
| Area covered by spray (in.) | 10 | 10 | 10 |
| Type of Nozzle | X5000 | TG1 | TG1 |
| Location of plaster feed | BASE OF EYE | | |
| Feed rate of plaster (gms/min) | 1200 | 1600 | 1600 |
| Feed height above bottom of disc (in.) | 10 | 10 | 10 |
| PRODUCT DATA: | | | |
| Bulk density (lbs./cu. ft.) | 37 | 45 | 43 |
| Water absorption (% of wt.) | 90 | 30 | 62 |
| Oil absorption (% of wt.) | 80 | 30 | 60 |
| BALLS RETAINED ON SCREEN MESH: | | | |
| Size No. - 2 (All are % of wt.) | 0 | 0 | 0 |
| 4 | 0 | 0 | 0 |
| 6 | 0 | 56.8 | 1.8 |
| 20 | 26.8 | 41.8 | 90.4 |
| 60 | 55 | .9 | 6.7 |
| Pan | 17.7 | 1.5 | 1.0 |
| Crushed Balls (Pass thru 6 mesh Retained on 60 mesh) | | | |
| Bulk density (lbs./cu. ft.) | | 44 | |
| Water absorption (% wt.) | | 50 | |
| Oil absorption (% wt.) | | 40 | |

EXAMPLE 4

The practice of the present invention for this operation corresponded to those previously described, but was performed solely for the purpose of showing a production operation using fines that were recycled from previous granule production, and were combined with plaster. For this run, Newark type plaster from British Gypsum was used. The water nozzle was positioned the same distance to the right in FIG. 6 as point D but lower toward the bottom portion of the disc than point D. It was displaced from the disc bottom the same height as all nozzle settings for EXAMPLE 1. All of the operating conditions are shown in the following table.

The resulting production run showed a uniform material movement which stabilized as could be determined from visual observation by the operator of the equipment. Of the granules produced those retained on the 2, 4, and 6 mesh screens were crushed after drying, and those retained on the 20 and 60 mesh screens were not crushed. The characteristics for those crushed as well as those which were not crushed are shown in the table. The EXAMPLE demonstrated a very satisfactory operation utilizing hemihydrate plaster up to 80% and dihydrate fines up to 20% in the manufacturing operation.

It is noted that the total of the BALLS RETAINED is 99%, and here, as for any other EXAMPLE described in this specification where the total is less than 100%, the volume measurements were of a production character rather than what might be more precise measurements for a laboratory experiment.

EXAMPLE 4

| EXAMPLE/SAMPLE | 4/1 |
|---|---|
| TYPE OF PLASTER | BRITISH GYPSUM NEWARK AND TWENTY (20%) PERCENT FINES |
| OPERATION OF DISC: | |
| Angle of disc (degrees from horiz.) | 30 |
| Speed of disc (RPM) | 18 |
| Location water spray (up in.) | 9 |

-continued

| EXAMPLE/SAMPLE | 4/1 |
| --- | --- |
| Location water spray (cross in.) | 16 |
| Flow rate of water (ml/min.) | 800 |
| Spray height above disc bottom (in.) | 7 |
| Area covered by spray (in.) | 10 |
| Type of nozzle | TG1 |
| Location of plaster feed | BASE OF EYE |
| Feed rate of plaster (gms/min) | 2100 |
| Feed height above bottom of disc. (in.) | 10 |
| PRODUCT DATA: | |
| Bulk density (lbs./cu. ft.) | 45 |
| Water absorption (% of wt.) | — |
| Oil absorption (% of wt.) | — |
| BALLS RETAINED ON SCREEN MESH: | |
| Size No. - 2   (All are | 2 |
| % of wt.) | |
| 4 | 23.1 |
| 6 | 20.1 |
| 20 | 40.6 |
| 60 | 10.1 |
| Pan | 3.1 |
| Crushed Balls (Pass thru 6 mesh | |
| Retained on 60 mesh) | |
| Bulk density (lbs./cu. ft.) | 44 |
| Water absorption (% wt.) | 54 |
| Oil absorption (% wt.) | 50 |
| Uncrushed Balls (Pass thru 6 mesh | |
| Retained on 60 mesh) | |
| Bulk density (lbs./cu. ft.) | 43 |
| Water absorption (% wt.) | 50 |
| Oil absorption (% wt.) | 50 |

EXAMPLE 5

This operation was performed for the purpose of showing that moulding plaster can be processed and variations accomodated for by adjustments of operating conditions in the same manner as the other commercial grade plaster employed in the preceding EXAMPLES as well as EXAMPLE 6 described subsequently. Again, the general procedure was followed as previously described for an operation. Of the granules produced, ninety-six percent (96%) were very satisfactory for cat box absorbent, and the 4% of the total granules retained on the 6 mesh screen were crushed for use as angular or irregularly shaped granules for oil and grease absorbent. The characteristics or properties determined for all granules are shown on the following table.

EXAMPLE 5

| EXAMPLE/SAMPLE | 5/1 |
| --- | --- |
| TYPE OF PLASTER | U.S. GYPSUM NO. 1 MOULDING PLASTER |
| OPERATION OF DISC: | |
| Angle of disc (degrees from horiz.) | 36 |
| Speed of disc (RPM) | 18 |
| Location water spray (up in.) | 9 |
| Location water spray (cross in.) | 7 |
| Flow rate of water (ml/min.) | 450 |
| Spray height above disc bottom (in.) | 7 |
| Area covered by spray (in.) | 10 |
| Type of nozzle | TG1 |
| Location of plaster feed | BASE OF EYE |
| Feed rate of plaster (gms/min) | 1550 |
| Feed height above bottom of disc. (in.) | 14 |
| PRODUCT DATA: | |
| Bulk density (lbs./cu. ft.) | 42 |
| Water absorption (% of wt.) | 47 |
| Oil absorption (% of wt.) | 41 |
| BALLS RETAINED ON SCREEN MESH: | |
| Size No. - 2   (All are | |
| % of wt.) | |

-continued

| EXAMPLE/SAMPLE | 5/1 |
| --- | --- |
| 4 | |
| 6 | 4 |
| 20 | 94 |
| 60 | 2 |
| Pan | 1 |
| Crushed Balls (Pass thru 6 mesh | |
| Retained on 60 mesh) | |
| Bulk density (lbs. cu. ft.) | 40 |
| Water absorption (% wt.) | 68 |
| Oil absorption (% wt.) | 66 |

EXAMPLE 6

The purpose of this EXAMPLE was to show that it is possible to control the size of the balls or granules to be produced in a manufacturing operation practiced according to the present invention. This was accomplished both with starting seed material granules effecting the size control of the production run, and with seed material granules of a different size than the starting material granules being introduced during the run. After the introduction of seed material granules during the run the size of the granules in the rotating disc which were larger than those desired were discharged or flushed out, and the seed materials as well as new granules grew in the same manner as previously described herein.

For such manufacturing operation where the necessary quantity of seed granules was introduced to change the granule size during the course of such run or operation, the new seed granules were fed into the rotating disc by a hand scoop until visual observation of the disc contents showed that there was a profile for the moving granules of which FIG. 5 is illustrative and an acceptable pattern of movement. Some twenty to thirty pounds of seed material might be required for a change in size by the hand scoop introduction method as described for the 39 inch disc as used herein.

More specifically, and referring to Sample 1, it was desired to manufacture a predominance of coarse granules, and the seed granules in the rotating disc were mostly of a 6 and a 20 mesh size and made a profile of which FIG. 5 is illustrative. The disc was rotated at 18 RPM and positioned at 36°. When the movement pattern was satisfactory the water was turned on to wet the seeds. When the movement pattern was then stabilized, with the water nozzle and plaster feed in the positions shown in the table, the latter was turned on and the seed granules grew and new granules were formed and grew. Production continued for approximately one-half hour. As the table shows, 64% of the granules were retained on the 6 mesh screen. These were crushed and the characteristics are shown for the crushed granules, as well as for the granules before crushing.

It was desired to produce finer granules as a maximum size, and with the plaster feed stopped but with the disc rotating, finer seed granules were introduced by a hand scoop as described above, for the purpose of filling the disc with a quantity which would cause the flushing out or the discharge of the larger granules from the disc so that the profile could be observed to correspond to a gradation in size as desired for production. The plaster feed was turned on and this run was continued as per Sample 2 of EXAMPLE 1. The table shows the corresponding change to a finer granule in the size manufactured.

For Sample 3, still finer granules were desired and finer seed material was added by a hand scoop while the disc rotated and the water was sprayed on the contents to keep it wet. The plaster feed had been turned off before adding the still finer seeds. The new seed material mixed with granules in the rotating disc, and granules grew until all larger ones were discharged and the profile was acceptable as well as the material movement pattern. Then the plaster feed was turned on and production was carried on for some half hour while grown granules were being discharged. The size of such grown granules and the operating conditions for this Sample 3 are shown below. All production was of a size retained on 20 mesh, 60 mesh, and in the pan, showing a successful change to finer granules from those of Sample 2.

Seed material can thus be used to make adjustments in the operation to change granule size, just as well as to control the granule size from the start-up load of seed material. Furthermore, it has been found that if the contents of the rotating disc, whether such content comprises seeds, new plaster forming and growing granules and water, or just new plaster and forming and growing granules mixed with water, seed material can be added by hand or by machine in a controlled quantity for adjustment of unacceptable operating conditions. For instance, if the contents become too wet and in a muddy condition and an unstable pattern results, seeds of a selected size and quantity can be added. Also, if the granules are growing larger than desired, or are too wet and are sticking together, in either case, the controlled addition of seeds until the condition is corrected will suffice. In other words, if the profile and movement pattern is visually seen to be getting out of adjustment, the addition of seed material of a proper size will correct the condition.

EXAMPLE 6

| EXAMPLE/SAMPLE | 6/1 | 6/2 | 6/3 |
|---|---|---|---|
| TYPE OF PLASTER | U.S. GYPSUM E. CHICAGO STUCCO | | |
| OPERATION OF DISC: | | | |
| Angle of disc (degrees from horiz.) | 36 | 36 | 36 |
| Speed of disc (RPM) | 18 | 18 | 18 |
| Location water spray (up in.) | 13 | 13 | 13 |
| Location water spray (cross in.) | 14 | 14 | 16 |
| Flow rate of water (ml/min.) | 450 | 450 | 450 |
| Spray height above disc bottom (in.) | 9 | 9 | 9 |
| Area covered by spray (in.) | 12 | 12 | 12 |
| Type of Nozzle | TG1 | TG1 | TG1 |
| Location of plaster feed | BASE OF EYE | | |
| Feed rate of plaster (gms/min) | 1600 | 1600 | 1600 |
| Feed height above bottom of disc (in.) | 10 | 10 | 10 |
| PRODUCT DATA: | | | |
| Bulk density (lbs./cu. ft.) | 48 | 45 | 35 |
| Water absorption (% of wt.) | 35 | 60.5 | 83 |
| Oil absorption (% of wt.) | 30 | 55 | 78 |
| BALLS RETAINED ON SCREEN MESH: | | | |
| Size No. - 2 (All are % of wt.) | | | |
| 4 | | | |
| 6 | | 64.0 | 10.6 | 0 |
| 20 | 34.2 | 80.0 | 83.5 |
| 60 | TRACE | 6.8 | 7.9 |
| Pan | 1.8 | 2.6 | 9.1 |
| Crushed Balls (Pass thru 6 mesh Retained on 60 mesh) | | | |
| Bulk density (lbs./cu. ft.) | 47 | | |
| Water absorption (% wt.) | 50 | | |

| EXAMPLE/SAMPLE | 6/1 | 6/2 | 6/3 |
|---|---|---|---|
| -continued | | | |
| Oil absorption (% wt.) | 50 | | |

EXAMPLE 6 evidences the fact that if production gets out of a uniform pattern for manufacturing the absorbent granules of the present invention, adjustments can be made to restore uniformity by the addition of seed material of a controlled size and in a controlled quantity, just as adjustments were made in disc speed and inclination, water feed and position of the nozzle and plaster feed and the position of such feed.

It is noted however, that if size of granules being manufactured represents the problem, and the granules are smaller than the size desired, the disc is stopped and the contents emptied from the disc. Then the operation is started up with a load of seed material in the disc corresponding generally to the size profile desired. If coarser seeds were added in the manner of the finer seeds by hand scoop or the like, those coarser seeds being the largest in the disc would be forced out immediately and would not affect the growth and size pattern as is the case when adjusting from coarser to finer granules, and adding finer seeds.

With respect to the operations or runs in all EXAMPLES noted, the same plaster and the same operating conditions produce different results in ball or granules size and characteristics. It is also a fact with gypsum plaster that the same plaster and the same operating conditions for the equipment may produce different results on different runs or operations. The present invention, however, provides a means or procedure which might be called a formulation that enables an operator to maintain a stabilized operating condition for whatever length of time is desired in high production runs. The pattern of movement of the material in the inclined rotating disc and the formation of the eye in that movement, and the size of the granules, provide a visual indication of the operating results irrespective of the particular characteristics of the commercial grade or type of gypsum plaster being processed. Then adjustments can be made as heretofore described and by the different means to restore production to an acceptable condition to produce the synthetic liquid absorbent granules desired.

Lastly, although the different EXAMPLES have been generally described as using a load of seed material in the rotating disc when starting a production run, this specification also refers to starting by (1) rotating the disc at a selected speed and (2) at a selected angle of inclination with the horizontal, (3) placing the nozzle for water spray at a selected position over the disc, and (4) selectively positioning the dry material feed over the disc. In time, and generally with adjustments in one or more of the above four conditions as well as the water introduced and the rate of feed delivered, balls or granules form, grow, and are discharged at their maximum size. Meanwhile, the pattern of movement of the material in the disc being monitored by visual observation of the operator will develop into a desired pattern indicating a stabilized condition for the process. The time for this start-up varies, but normally it is longer than for a second procedure in starting.

The second procedure is preferred because proper operating conditions can be attained and be stabilized more quickly, and this procedure is to fill the disc with preformed seed material, made generally from gypsum plaster and corresponding in a graduated size to the synthetic absorbent granules to be manufactured by the present process, and rotate the disc before turning on the water to permit or cause the seed material to achieve a visible uniform pattern of movement. This procedure has been fully described, and more particularly, both for starting and for adjusting relative to the runs of EXAMPLE 6.

What is claimed is:

1. A process for manufacturing absorbent gypsum granules of a predetermined size which comprises the steps of provided a rotating, substantially cylindrical pan of predetermined depth and having the axis of rotation thereof inclined from vertical;

providing in said pan wet seed granules having a predetermined moisture content in an amount sufficient to form a particular circulating mass within the pan while the pan is rotating, said circulating mass including seed granules of said predetermined size;

rotating said pan at an inclination and rotational speed so as to produce within said circulating mass a substantially stable eye, said eye being situated substantially within the ascending half of the circular pan;

feeding a dry mixture of calcium sulfate hemihydrate powder and calcium sulfate dihydrate fines onto said particulate circulating mass at the base of said eye;

spraying water on the particulate circulating mass situated in the central region of the pan and adjacent to said eye in an amount sufficient to maintain independent movement of the particles constituting the particulate circulating mass while agglomerating said calcium sulfate hemihydrate powder and calcium sulfate dihydrate fines into granules of predetermined size and initiating hydration of the calcium sulfate hemihydrate to gypsum;

recovering the produced granules as these granules roll off the edges of said rotating pan;

drying the recovered granules;

classifying the recovered granules and segregating oversize granules from granules of said predetermined size;

crushing at least a portion of the oversize granules into calcium sulfate dihydrate fines; and recycling said fines to said rotating pan.

2. The process in accordance with claim 1 wherein said calcium sulfate dihydrate fines constitute up to about 20 weight percent of the dry mixture fed onto said particulate circulating mass.

3. A process for manufacturing synthetic liquid absorbent gypsum granules wherein calcium sulfate hemihydrate powder particles are converted to calcium sulfate dihydrate in the course of producing granules of a desired size substantially larger than said powder particles, said granules being usable for liquid absorbent purposes such as in animal toilet boxes, to absorb undesirable accumulations of oils, greases and other liquids, and to serve as carriers for agricultural chemicals which are to be distributed with said granules as the carriers therefor, comprising the steps of:

(a) providing a rotatable disc positionable at selected inclinations relative to the horizontal for receiving said powder particles and forming said granules therein, (b) providing seed granules of varying sizes in said disc in a quantity to substantially fill said disc in an inclined position, (c) rotating said disc at a selected speed to cause said seed granules to move therein in accordance with a relative uniform pattern of movement and to define an eye, (d) feeding said powder particles at a controlled rate into said rotating disc at the base of said eye, (e) introducing water to said rotating disc for wetting seed granules and powder particles therein and mixing with the same, (f) combining said seed granules with wet powder particles and growing to a size such that the resulting granules are discharged from said rotating disc, (g) growing calcium sulfate dihydrate granules in said rotating disc from a powder particle size to said desired size and moving said granules within said disc while growing until said granules drop from said rotating disc at said desired size, (h) drying said granules dropped from said disc to remove excess water therefrom while retaining said dihydrate chemical composition in said granules, (i) screening said dried granules and separating from those of a desired size the granules that are undersized and oversized relative to said desired size, (j) crushing said oversized granules to produce granules of desired size and fines, and (k) recycling said undersized granules and fines in controlled quantities with controlled quantities of said powder particles and mixing the same in said rotary disc with water to form and complete granules in accordance with the steps defined in paragraphs (g) and (h) above for use in liquid absorbent purposes.

* * * * *